United States Patent
Forssell et al.

(10) Patent No.: US 6,718,179 B1
(45) Date of Patent: Apr. 6, 2004

(54) METHOD AND DEVICES FOR IMPLEMENTING A CONTINUED PACKET-SWITCHED RADIO CONNECTION

(75) Inventors: Mika Forssell, Espoo (FI); Petri Grönberg, Espoo (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/480,071

(22) Filed: Jan. 10, 2000

(30) Foreign Application Priority Data

Jan. 11, 1999 (FI) .................................................. 990039

(51) Int. Cl.⁷ ................................................ H04Q 7/20
(52) U.S. Cl. ........................ 455/509; 455/450; 370/252; 370/329; 370/348
(58) Field of Search ................................. 455/466, 447, 455/450–452, 458, 464, 509; 370/252, 319, 320, 321, 322, 329, 330, 328, 338, 335, 351, 352, 357, 400, 348

(56) References Cited

U.S. PATENT DOCUMENTS

| | | | |
|---|---|---|---|
| 3,898,390 A | 8/1975 | Wells et al. ................... | 325/15 |
| 5,574,774 A | 11/1996 | Ahlberg et al. ............... | 379/59 |
| 5,673,259 A | * 9/1997 | Quick, Jr. ..................... | 370/342 |
| 5,708,656 A | 1/1998 | Noneman et al. ............ | 370/320 |
| 5,754,542 A | 5/1998 | Ault et al. .................... | 370/342 |
| 5,802,472 A | 9/1998 | Taniguchi .................... | 455/445 |
| 5,850,611 A | 12/1998 | Krebs .......................... | 455/518 |
| 6,032,040 A | * 2/2000 | Choy et al. ................... | 455/414 |
| 6,317,854 B1 | * 11/2001 | Watanabe ..................... | 714/749 |

FOREIGN PATENT DOCUMENTS

| | | |
|---|---|---|
| EP | 0812118 A2 | 12/1997 |
| EP | 0872982 A1 | 10/1998 |
| EP | 1045559 A1 | 10/2000 |
| WO | WO 98/44639 | 10/1998 |

OTHER PUBLICATIONS

"Radio Link Control/Medium Access Control (RLC/MAC) GSM 04.60 Version 6.2.0 Release 1997" Digital Cellular Telecommunications System (Phase 2+); GPRS; MS; BSS Interface—ETSI, Oct. 1998 pp. 1–172 XP002239654.

* cited by examiner

Primary Examiner—Jean Gelin
(74) Attorney, Agent, or Firm—Perman & Green, LLP (57) ABSTRACT

A method is presented for establishing a continued communication connection after a terminating communication connection between a transmitting station and a receiving station in a communication system where communication connections take place on dedicated communication resources temporarily associated to them. The termination of the terminating communication connection is indicated through a communication resource associated to the terminating communication connection (304, 404, 405, 504). The need for a continued communication connection is also indicated through a dedicated communication resource (305, 408, 408', 509).

18 Claims, 6 Drawing Sheets

METHOD AND DEVICES FOR IMPLEMENTING A CONTINUED PACKET-SWITCHED RADIO CONNECTION

TECHNOLOGICAL FIELD

The invention concerns generally the technology of allocating resources for individual radio connections at the interface between a transmitting device and a receiving device. Especially the invention concerns the allocation of radio resources for a packet-switched radio connection which is a continuation of a previous connection of essentially the same type.

BACKGROUND OF THE INVENTION

Multi-user radio communication systems must have well-defined procedures for allocating radio resources (time, frequency) to individual radio connections. In this patent application we will consider especially packet-switched radio connections in cellular radio systems where each cell comprises a base station which is arranged to communicate with a multitude of mobile stations. As an example we will discuss the well-known GPRS system (General Packet Radio Service), the known resource allocation procedures of which are laid down in the technical specification number GSM 04.60 published by ETSI (European Telecommunications Standards Institute). The acronym GSM refers to the known Global System for Mobile telecommunications. We will briefly describe some parts of said specification in the following.

The concept of Temporary Block Flow or TBF has been introduced to facilitate the unidirectional transfer of data between a base station and a mobile station. According to its definition, a TBF is a physical connection used by two mutually communicating RR (Radio Resource) entities to support the unidirectional transfer of the Protocol Data Units or PDUs from upper (LLC; Logical Link Control) layers on physical channels for packet data. We will consider separately uplink TBFs (transfer of data from the mobile station to the base station) and downlink TBFs (transfer of data from the base station to the mobile station), starting with the first of these.

During an uplink TBF the mobile station will organise the data to be transferred into Protocol Data Units or PDUs. These are in turn divided into smaller parts which are distributed into RLC data blocks, where RLC comes from Radio Link Control which is one of the layers in the protocol stack which defines the procedures related to information transfer over the radio interface. Each RLC data block will have a corresponding identification number as well as a multitude of associated fields containing information that relates to the contents and significance of the RLC data block. One of said fields contains a so-called Countdown Value or CV which is a non-negative integer number less than or equal to 15. A value 15 in the CV field indicates that there are so many remaining RLC data blocks to be transmitted during the present uplink TBF that their number, scaled by the number of timeslots assigned to the uplink TBF, is greater than the value of a certain broadcast parameter BS_CV_MAX. All smaller values in the CV field indicate that there are exactly that many remaining RLC data blocks, scaled by the number of timeslots assigned to the uplink TBF, to be transmitted.

Figure 1:
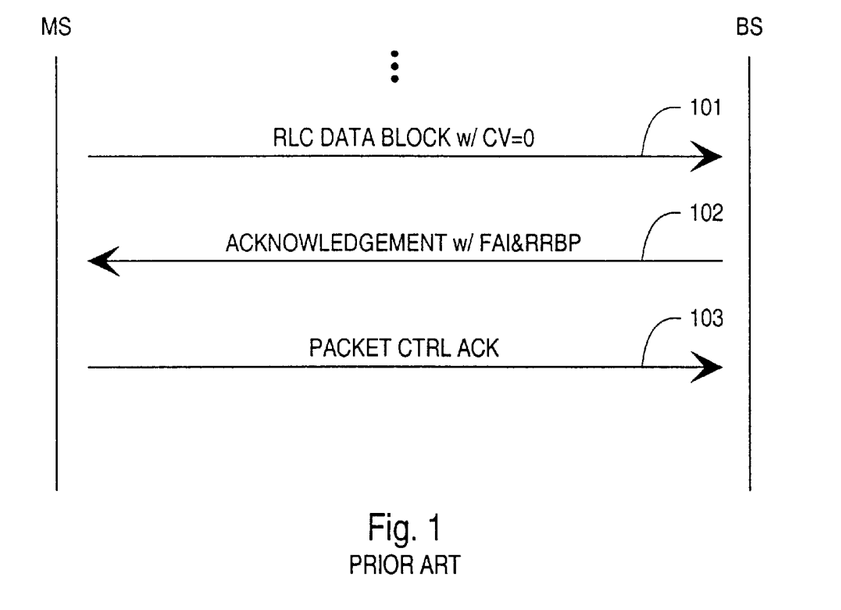
FIG. 1 illustrates the known terminating procedures of an uplink TBF.

Fig. 1 illustrates the procedures relating to the end of an uplink TBF, with time running from top to down. At step 101 the mobile station MS transmits to the base station BS (or more generally: to the network) an RLC data block with a CV value 0, indicating that there are no remaining RLC blocks to be transmitted. Having successfully received the last RLC block and detected it as such, the base station (or network) transmits to the mobile station an acknowledgement message at step 102 with a certain Final Ack Indicator or FAI indicating that no further retransmissions of RLC data blocks are required. The same acknowledgement message will contain a valid RRBP (Relative Reserved Block Period) field assigning to the mobile station one uplink sending permission which the mobile station will use to transmit at step a Packet Control Acknowledgement message indicating that the final acknowledgement from the base station has come through. After having received the last-mentioned message the network is free to re-allocate the resources previously reserved for the discussed TBF to some other purposes.

The concept of Block Periods is associated with the fact that in GPRS the capacity of a Packet Data Channel or PDCH can be shared by many TBFs and so the network allocates packet data resources for the mobile stations in the units of an RLC block period.

Figure 2:
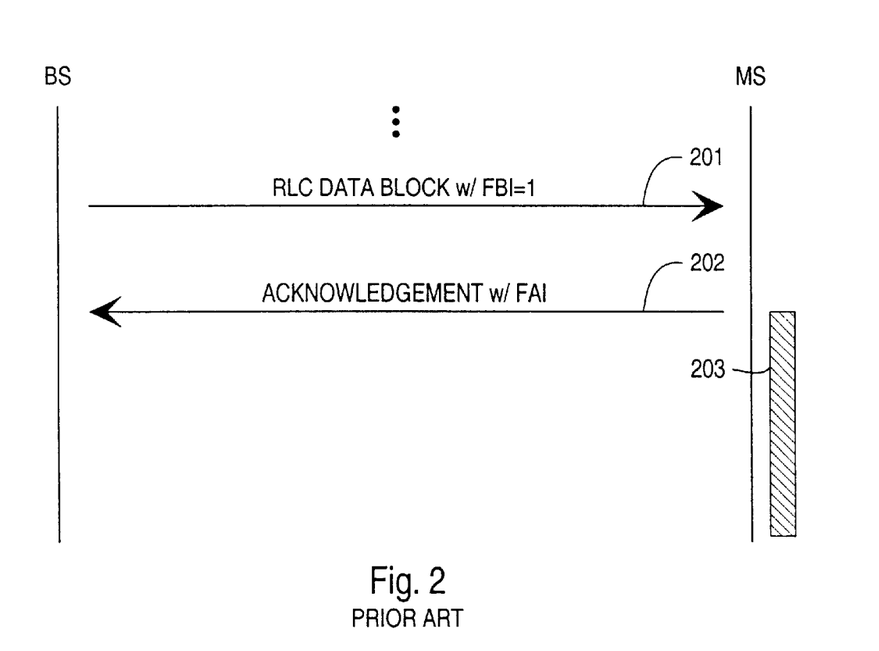
FIG. 2 illustrates the known terminating procedures of a downlink TBF.

During a downlink TBF a similar arrangement of successive RLC data blocks is produced by the network and transmitted to the mobile station. A CV field is not present in the downlink RLC data blocks, but there is a so-called FBI or Final Block Indicator bit which is used to mark the last RLC data block. In FIG. 2, step 201 corresponds to the network transmitting to the mobile station an RLC data block with FBI value '1'. Taken that there were no previous unsuccessfully transmitted RLC data blocks that would require retransmission, the mobile station answers with an acknowledgement message at step 202 with a Final Ack Indicator or FAI indicating that no further retransmissions of RLC data blocks are required (if retransmissions would have been required, a number of retransmission requests and retransmissions would come in between steps 201 and 202). Simultaneously it starts a timer of predetermined duration which is illustrated in FIG. 2 as the hatched bar 203. While the timer is running the mobile station continues to monitor the Packet Data Channels or PDCHs which were assigned to the TBF. If the mobile station receives on a monitored channel another RLC data block with the FBI set to '1' while the timer is running, it will retransmit the final acknowledgement message. After the timer has expired, the mobile station will consider the TBF as released, abort the monitoring of the assigned Packet Data Channels and return to a state in which it monitors one or more common control channels.

The problems of the described terminating procedures for uplink and downlink TBFs (or, more generally, packet-switched radio data connections) arise from the occasional need for continuing a connection for which the termination procedures have already been initated. It may happen that the application that produces the information to be transmitted reactivates with a short notice, or an additional burst of information to be transmitted emerges for some other reason. Let us briefly describe what happens according to the known features of GPRS.

In an uplink connection, the mobile station is not allowed to increment the value of the CV field if it is already less than 15, even if it suddenly finds out that there are actually more RLC data blocks to be transmitted than what the value in the CV field would suggest. According to the known specifications the terminating TBF must be completely exhausted, i.e. the value of the CV field must decrease monotonously until the mobile station and the base station have gone through the procedures described above with reference to FIG. 1. For the new data the mobile station must request a completely new allocation of radio resources by first transmitting a request message on an access channel (PRACH or RACH; Packet Random Access Channel or Random Access Channel depending on whether or not the first one of these is available). The network will either grant or reject the request by sending a corresponding message on an access grant channel (PAGCH or AGCH; Packet Access Grant Channel or Access Grant Channel, same considerations of availability apply). The access-request-and-grant procedure may take several seconds which causes unnecessary delay to the transmission of information. It also causes a considerable amount of signalling traffic and may give rise to collisions with other simultaneous access requests from other mobile stations in the same cell.

In the downlink direction the network may send to the mobile station a Packet Downlink Assignment on a PACCH (Packet Associated Control Channel) which the mobile station is monitoring while the termination timer referred to above is running, but the mobile station will interpret such an assignment as a resource reassignment. In other words the mobile station will change to the new time/frequency combination defined in the assignment and continue the downlink TBF release procedure there although the network has successive PDUs to be transmitted. The mobile station will thus listen the allocated PDCHs until the termination timer expires after which it will consired the TBF as released, abort the monitoring of the assigned PDCHs and return to a state in which it monitors one or more common control channels. Also it may happen that the network should transmit successive PDUs which require a different RLC mode. To change RLC modes the network must allow for the termination timer in the mobile station to expire and establish a completely new TBF by sending a Packet Downlink Assignment message on a PCCCH or CCCH (Packet Common Control Channel or Common Control Channel depending on availability).

From the technology of circuit-switched radio telephone connections there is known a method for providing a terminal device with a certain amount of reserved radio resources after the termination of a connection. The U.S. Pat. No. 5,574,774 describes a system in which certain subscribers of a mobile telephone network may enjoy a privileged service so that after the privileged subscriber has taken part in a telephone connection and the other party of that connection has terminated the call, the privileged subscriber still has at his disposal the resources that were allocated to the call for a certain duration of time. The reason for keeping the resources reserved is to guarantee for the privileged subscriber the right to make another call even if there is congestion in the network. The party that will benefit the most from such an arrangement is the mobile telephone operator, because from the network point of view keeping the resources reserved corresponds to conducting an active telephone call and is charged for accordingly; for those cases in which the privileged subsciber is not interested in using his priority rights he will end up paying for nothing.

SUMMARY OF THE INVENTION

It is an object of the present invention to provide a method, a mobile station and a network device for enabling a fluent continuation from an old packet-switched communication connection to a new one. It is also an object of the invention that it will require only a moderate amount of signalling over the radio interface.

The objects of the invention are achieved by incorporating into the terminating procedures of a packet-switched communication connection a certain message through which the transmitting device may inform the receiving device about its need to continue the transfer of information.

It is characteristic to the method according to the invention that it comprises, in the following order, the steps of
 indicating the termination of a terminating communication connection through a communication resource associated to the terminating communication connection and
 indicating the need for a continued communication connection through a dedicated communication resource.

The invention applies also to a mobile station comprising as its characteristic features the means for
 indicating the termination of a terminating uplink communication connection through a communication resource associated to the terminating communication connection and
 indicating the need for a continued uplink communication connection through a dedicated communication resource.

Additionally the invention applies to a base station subsystem characterised in that it comprises means for
 indicating the termination of a terminating downlink communication connection through a communication resource associated to the terminating communication connection and
 indicating the need for a continued downlink communication connection through a dedicated communication resource.

We will continue considering the uplink and downlink cases separately because of their slightly differing characteristics. In the uplink case it is on the responsibility of the mobile station to indicate to the network that the packet-switched connection should continue. This will require a corresponding message to be transmitted in the uplink direction from the mobile station to the base station. According to the invention, instead of just acknowledging the final message sent by the network and indicating the succesful reception of the last uplink part of the terminating connection, the mobile station will use the available responding resources to make said indication. The network has then the choice to either reject or accept the indication. In the case of acceptance, a new (or continued) connection will be set up without the need for the mobile station to go through the previously inevitable time-consuming access request round on a random access channel that is common to all mobile stations.

In the downlink case it is the network that has to indicate to the mobile station the suddenly occurred need to continue transmitting data on a dedicated channel. According to the invention the network will exploit the time during which the mobile terminal is still monitoring the previously allocated dedicated channels and transmit an assignment message. In order to avoid the simple resource reassignment interpretation referred to above in the description of prior art, the network will introduce into the assignment a specific field the value of which tells the mobile station to interpret the assignment differently. This way it is possible to even completely reconfigure the packet-switched connection before continuing the transmission of data, and still the use of a common control channel is avoided.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

FIG. 4b illustrates an alternative final stage to the application of FIG. 4a

DETAILED DESCRIPTION OF THE INVENTION

Figure 3:
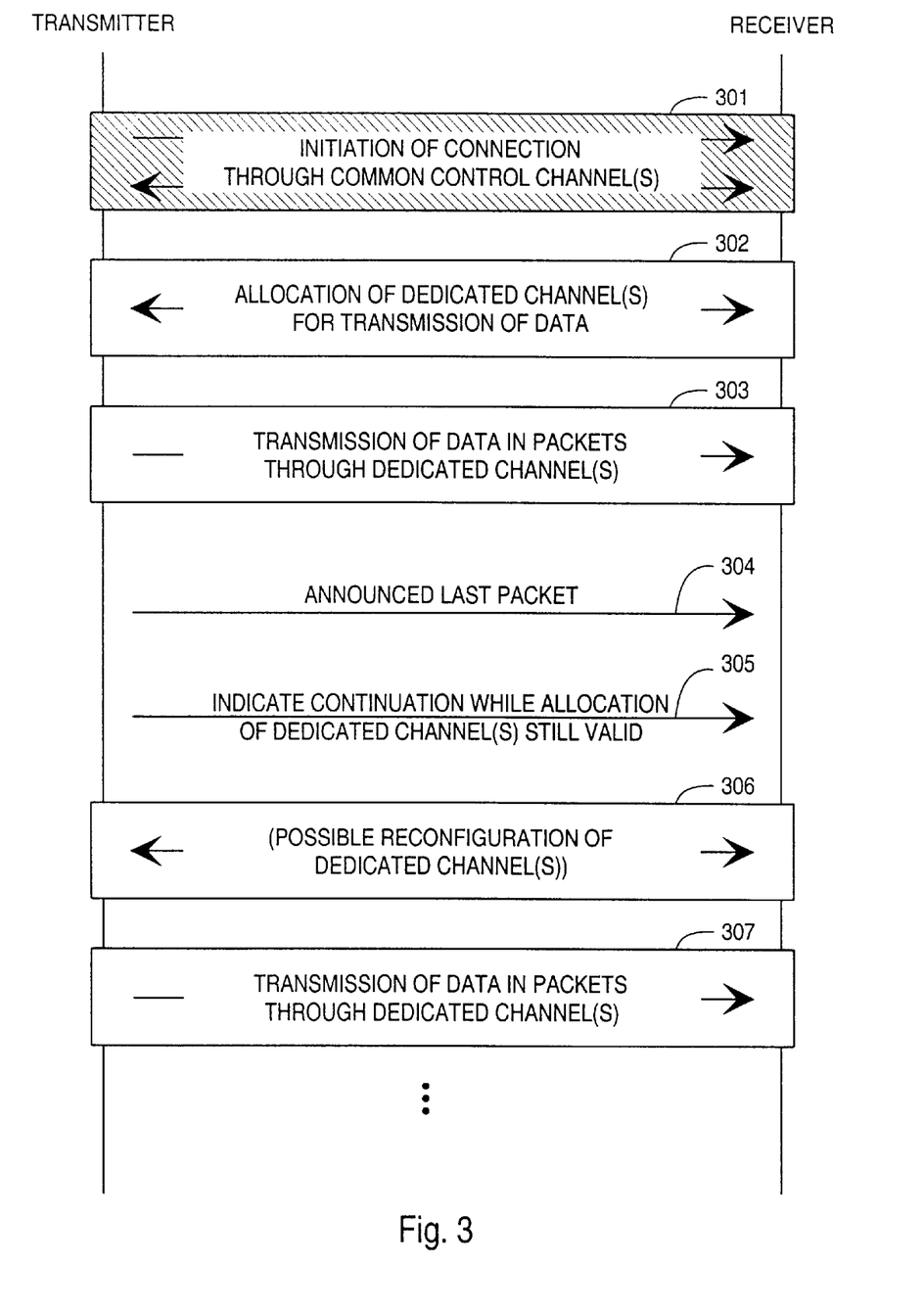
FIG. 3 illustrates the principle according to the invention.

In FIG. 3 a transmitting device and a receiving device are illustrated schematically as communicating parties. We will actually assume that both of these devices are capable of transmitting and receiving, but the designations refer to their primary functions within a packet-switched communication connection. We will further assume that the transmitter and receiver are operating in a multi-user environment where there is a certain set of common control channels available to a large number of users and where dedicated communication channels may be allocated to individual connections according to need.

The hatched block 301 represents the initiation of a packet-switched communication connection which starts by the transmitter sending an initial indication about its need to set up a connection. This initial transmission takes place usually on a common control channel, as illustrated by the upper, single-ended arrow in block 301, and some further exchange of information on the common control channels may follow it as illustrated by the lower, double-ended arrow in block 301. The device which is responsible for allocating the dedicated communication channels allocates at least one dedicated channel for the needs of the connection; the double-ended arrow in block 302 represents the fact that two-way traffic may be required to acknowledge the allocation, or the actual allocation message may travel in either direction depending on which one of the devices performs the allocation. The dedicated communication channels may comprise data channels, control channels, and/or other kinds of channels according to need.

The actual transmission of packets takes place on the dedicated communication channel(s) according to block 303. For the purposes of generally describing the communication connection we may suppose that the allocation of dedicated communication channel(s) remains valid for as long as the transmitting device has remaining packets to transmit. At some stage the transmitting device notices that the packets are running out, so it announces a certain packet as the last one as illustrated by the arrow 304. A prior art arrangement would then result in the channel allocations made in block 302 being cancelled even if the transmitting device suddenly noticed that some new packets have appeared. A new initiation round through the common control channel(s) like the one of block 301 would be required. According to the invention, the transmitting device exploits the remaining dedicated channel allocation and sends an indication 305 about the need for a continued packet-switched communication connection after the last packet (so far) has been announced but before the channel allocations are completely abolished.

The continued packet-switched communication connection may have different resource requirements than the previous one, or some other factors like the general traffic situation or a competing channel allocation may make it impossible to reuse the previous channel allocation as such. In such case a reconfiguration of the dedicated channel(s) is performed as illustrated by block 306. After a valid channel allocation has been established by either re-allocating at least partly the previously allocated dedicated communication channels or by allocating new resources (or by combining these two operations) the transmission of packets may continue as illustrated by block 307. After the newly appeared reservoir of packets has been exhausted the connection may be terminated according to any known procedure, or a new continued connection may be established by starting again from step 304. The invention does not limit the number of repetitions through steps 304 to 307.

Figure 4A:
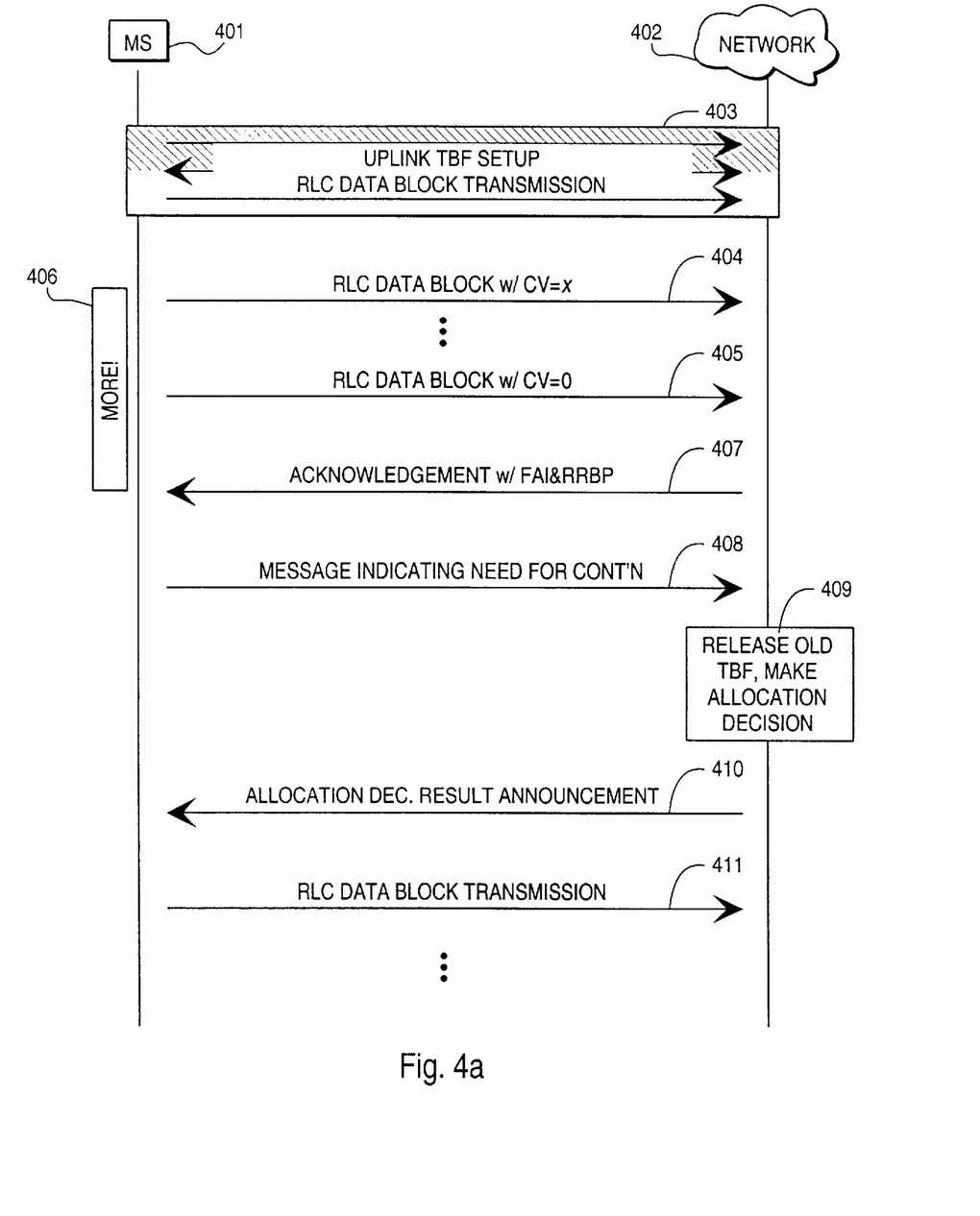
FIG. 4a illustrates a first application of the principle of FIG. 3.

We will next describe the application of the above-explained principle to a continued uplink TBF that generally corresponds to the previously mentioned GPRS specifications. In FIG. 4a the mobile station 401 is the transmitter, and the receiver is generally represented by the network 402. The procedures concerning the RLC protocol layer are taking place between the mobile station and a base station subsystem, the latter comprising generally base stations and a base station controller or a similar supervisory unit. However, it is to be understood that the network devices that take part in the communication connection as a whole are the known parts of a GSM/GPRS network, comprising but not being limited to a base station, a base station controller or a radio network controller, a packet control unit, a serving GPRS support node and a gateway GPRS support node.

Setting up an uplink TBF and transmitting a flow of RLC data blocks through it as illustrated by block 403 take places according to known procedures which are outside the scope of the present invention and will not be described in detail. The hatched upper part of block 403 reminds the reader about the fact that these procedures start usually from the common control channels. If at the time of setting up an uplink TBF there already exists a downlink TBF between the mobile station and the base station, the mobile station will transmit the initial request for setting up the uplink TBF through the signalling mechanisms related to the downlink TBF. The messages in which such a request will be communicated are the Packet Downlink Ack/Nack messages which the mobile station transmits on a Packet Associated Control Channel or PACCH. The invention does not set any specific limits to the procedures that are used to initially set up the TBF, but it is very illustrative to the applicability of the invention to regard the setup as taking place on the common control channels.

At step 404 the mobile station has exactly so many RLC data blocks left that their number, scaled by the number of timeslots assigned to the uplink TBF, is equal to the parameter BS_CV_MAX, so it sets the CV value of the current RLC data block accordingly. The exact value x of the CV field is calculated from the formula given under heading 9.3.1 Countdown Procedure of said specification, $$x = \text{round}\left(\frac{TBC - BSN' - 1}{NTS}\right) \quad (1)$$

where TBC is the total number of data blocks that will be transmitted in the uplink TBF, BSN' is the absolute block sequence number of the current RLC data block and NTS is the number of timeslots assigned to the uplink TBF. From step 404 the mobile station will insert the appropriate value of x into the CV field of each RLC data block, until at step 405 it transmits the last RLC data block with the value x=0 in the CV field.

At step 407 the network transmits a normal Packet Uplink Ack (or Nack) message with the FAI indicating its finality. According to block 406, at some stage between steps 404 and 407 the mobile station has found out that there are actually more RLC data blocks to be transmitted, so a continued TBF will be needed. Instead of transmitting a simple acknowledgement for the final Packet Uplink Ack (or Nack), at step 408 the mobile station transmits a message that contains an indication about its need for continuing the transmission. This message may completely replace the known Packet Control Acknowledgement message, or it may be a Packet Control Acknowledgement message comprising an additional information part which the network is able to interpret as an indication for the need of a continued connection. If it is a complete replacement, it might be for example a Packet Resource Request message in the form which is already defined in the specifications.

At step 409 the network knows that the mobile station has successfully received the final Packet Uplink Ack (or Nack), so it may release the resources that had been reserved for the terminating uplink TBF. However, the network is also aware of the mobile stations's request for a continued TBF, so it makes a resource allocation decision exactly as if it had received a known Packet Resource Request message with no associations to a simultaneously terminating old TBF. If the resource allocation decision is positive, the network transmits a corresponding resource allocation message (currently known as the Packet Uplink Assignment message) to the mobile station at step 410. In the case of a negative resource allocation decision, step 410 corresponds to the transmission of a rejection (currently known as the Packet Access Reject message). It is advantageous to use the same PDCH or Packet Data Channel for the transmission of the message at step 410 which the mobile station used to send its acknowledgement combined with the additional resource request at step 408. We will assume that the decision was positive: after having received an allocation of resources the mobile station may start to transmit RLC data blocks again at step 411. If the decision was negative, communication would simply end after step 410 and the mobile station would have to revert to the common control channel(s) where it could then again try requesting resources as is known from prior art arrangements.

Figure 4B:
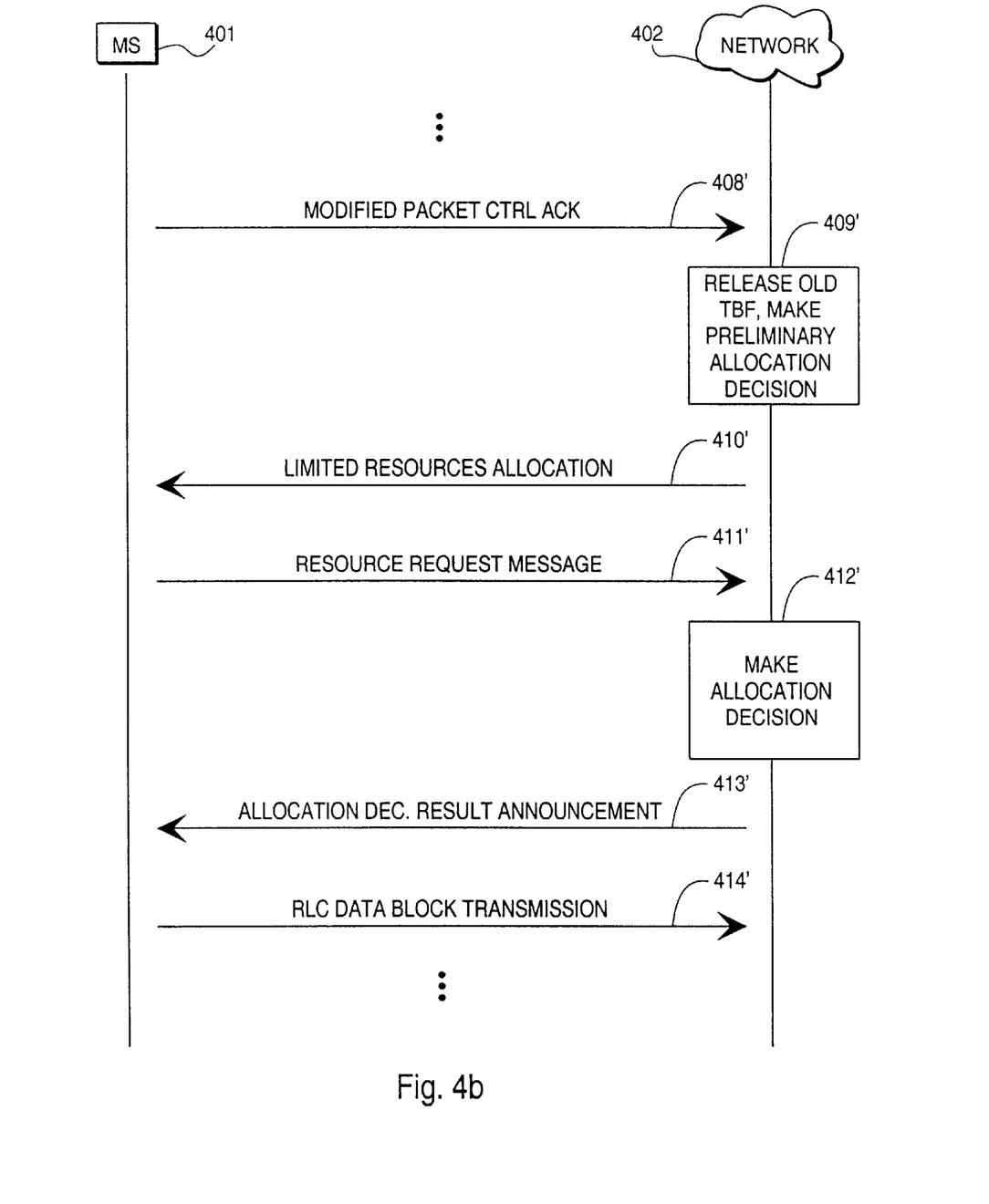

If the message transmitted by the mobile station at step 408 was only a slightly modified acknowledgement for the final Packet Uplink Ack (or Nack), it may happen that there was not enough space in the message to express the continuing communication needs of the mobile station in detail. The message may be for example in the form of an access burst, which has limited capacity of transmitting additional information compared to a normal traffic burst. FIG. 4b illustrates a procedure in which the mobile station transmits such a slightly modified acknowledgement at step 408': one well-defined bit is enough to convey to the network the need for a continued connection. At step 409' the network makes a preliminary decision to either reject the request (for example due to bad congestion) or to ask for details. At step 410' the network transmits a message that assigns a limited amount of resources to the mobile station, which uses this opportunity to transmit at step 411' a detailed Packet Resource Request message or another message specifying its needs for a continued connection. At step 412' the network makes a final resource allocation decision and at step 413' it informs the mobile station about its results: it either rejects the mobile station's request, in which case communication ends thereafter, or it grants a decided amount of resources, in which the transmission of RLC data blocks will start at stage 414'.

Figure 5:
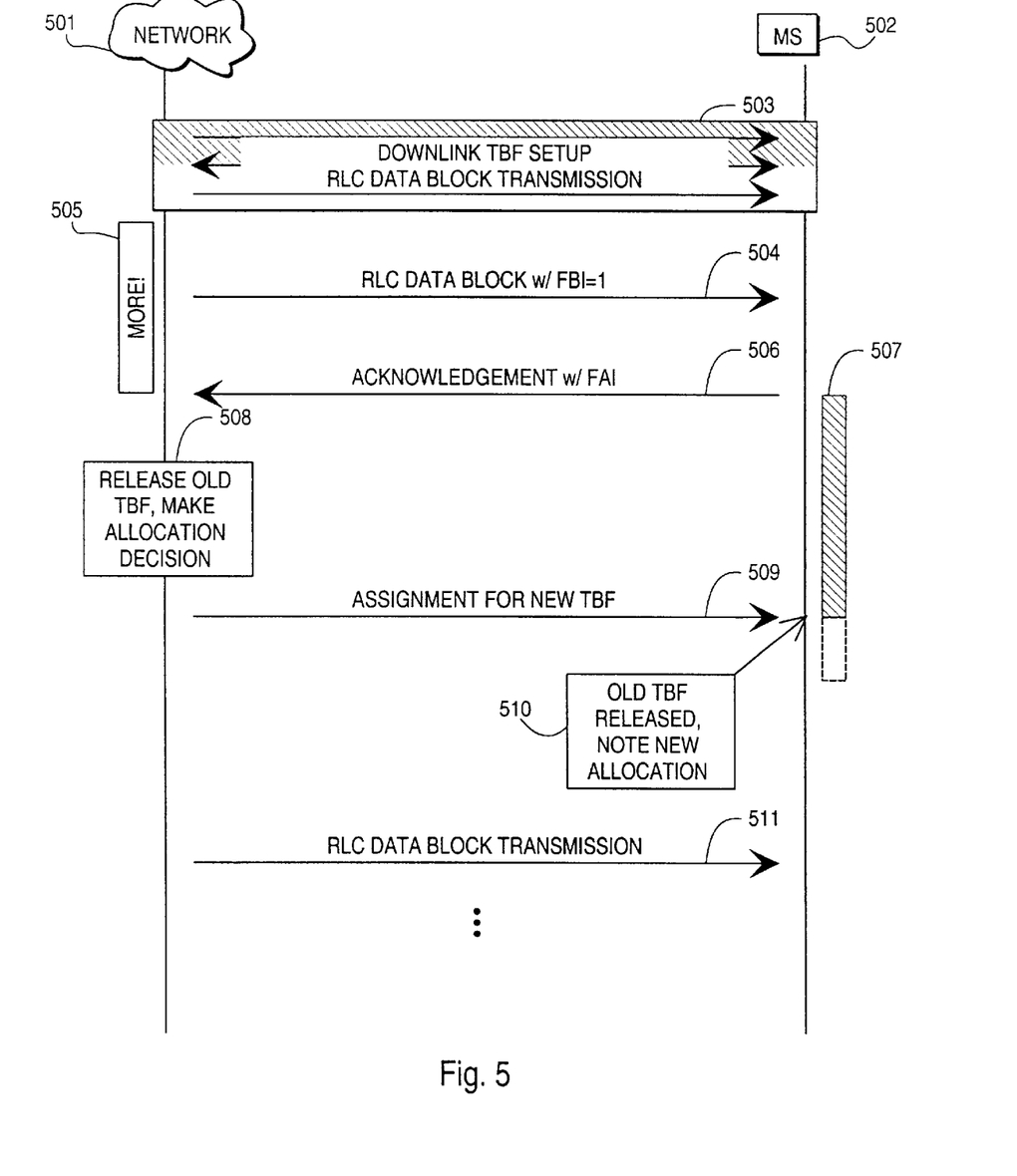
FIG. 5 illustrates a second application of the principle of FIG. 3.

We will next describe application of the principle of FIG. 3 to a continued downlink TBF that generally corresponds to the previously mentioned GPRS specifications. In FIG. 5 the transmitter is generally represented by the network 501 and the mobile station 502 is the receiver. We will later describe in detail the role of the different network devices in the operation described generally at the left-hand side of FIG. 5 and the right-hand side of FIG. 4.

The setup from scratch and operation of a downlink TBF will follow the previously known procedures. These are again outside the scope of the invention and represented generally by block 503 in FIG. 5. If an uplink TBF exists at the time of setting up the downlink TBF, there exists the possibility for the network of using a specific Assignment message in the dedicated control channels of the uplink TBF to initiate the setup of a downlink TBF. At step 504 the network transmits the RLC data block which it currently regards as the last one, and indicates this by setting the FBI bit of that RLC data block to '1'. At step 506 the mobile station which at this stage has no means of knowing about the additional RLC data blocks transmits the Packet Downlink Ack message (in case there existed a need for retransmissions at this stage, the mobile station would transmit a Packet Downlink Nack message, which would cause the network to retransmit the requested RLC data blocks—eventually the procedure will end in the transmission of a Packet Downlink Ack message). Simultaneously the mobile station will start a certain timer as indicated by the hatched bar 507. Around the time between steps 504 and 506 the network realises according to block 505 that there are still other RLC data blocks to be transmitted so a continued downlink TBF will be needed.

The network knows that while the timer 507 is running in the mobile station, it may still use the previously allocated dedicated channel(s) to transmit messages to the mobile station. The network releases the old TBF and allocates resources for a new TBF at step 508 (actually the allocation of resources for the new TBF may be decided upon already at the time when the network becomes aware of the need for a continued connection). At step 509 the network transmits a modified Packet Downlink Assignment message which contains, contrary to the previously known Packet Downlink Assignment messages, an additional field which we will call the CONTROL_ACK field. It does not need to be larger than one bit. According to an advantageous embodiment of the invention a bit value '1' in the CONTROL_ACK field indicates to the mobile station that the Packet Downlink Assignment message defines the resources allocated to a new downlink TBF instead of just being a reallocation of the old resources. As a result, at step 510 the mobile station considers the previous downlink TBF as released and a new downlink TBF as set up. It also resets the timer 507. At step 511 the transmission of downlink RLC data blocks may continue through the newly defined downlink TBF.

The advantage of releasing the old TBF and immediately setting up a new one instead of just continuing with the previous resource allocations is that the characteristics of the new TBF may be quite different from those of the old one. Indeed the invention does not require that the transmitting side only gets to know about the additional RLC data blocks at the very closing stage of the old TBF. It may happen, for example, that the transmitting device knows from the beginning that some parts of the data to be transmitted requires a different RLC mode (acknowledged/unacknowledged). According to the current specifications changing the RLC mode is not allowed in the middle of a TBF so prior art arrangements have required that once the part of the information with the first RLC mode requirement has been transmitted, the old TBF used for that must be released and a new TBF must be set up through a time- and resource consuming visit to the common control channels. According to the invention such a case is easily handled by setting up the new TBF as a continued packet-switched communication connection as described above with reference to FIGS. 3 to 5.

Figure 6:
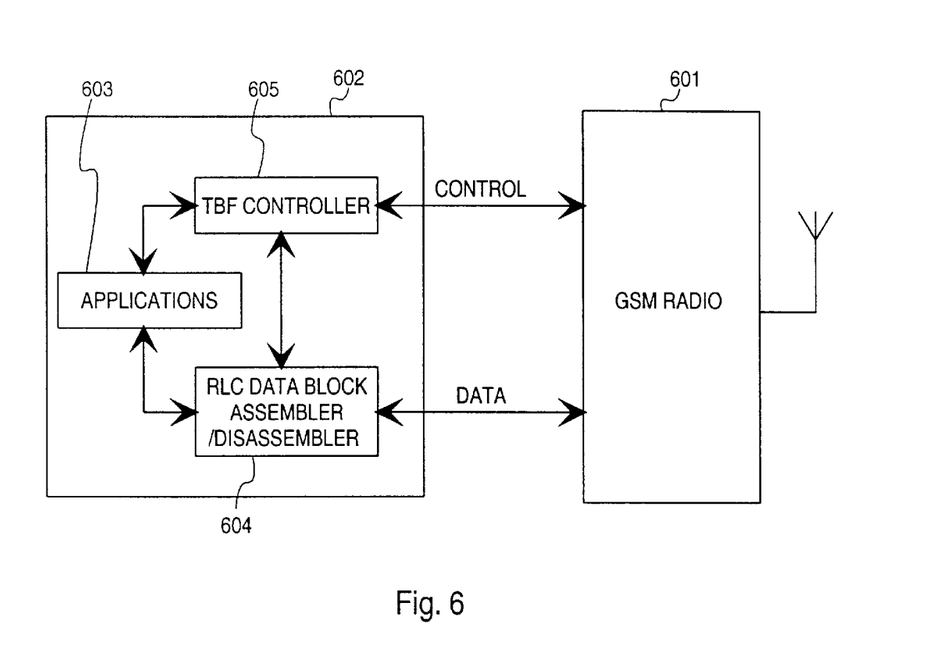
FIG. 6 illustrates an exemplary mobile station according to the invention.

We will then briefly describe a mobile station and a base station subsystem according to an advantageous embodiment of the invention. FIG. 6 illustrates schematically a mobile station which comprises a GSM radio transceiver 601 known as such as means for implementing packet-switched radio connections with a remote base station. A packet data part 602 is coupled to the GSM radio transceiver. The source and sink of transmitted and received data respectively is the applications block 603, and the transmission of data between it and the GSM radio transceiver goes through a RLC data block assembler/disassembler 604. A TBF controller 605 is responsible for setting up and maintaining the TBFs according to the needs expressed by the applications block on one hand and to the setup requests received from the network on the other. According to the invention the TBF controller 605 is arranged firstly to construct the acknowledgement messages to received final acknowledgements so that if at the time of receiving a final acknowledgement there are still uplink RLC data blocks to transmit, the final acknowledgement will not be answered with a conventional Packet Control Acknowledgement message but with either a completely replacing Packet Resource Request message or with a modified Packet Control Acknowledgement message indicating the need for a continued packet-switched communication connection. Secondly the TBF controller is arranged to watch for the value of the CONTROL_ACK field in received Packet Downlink Assignment messages and to interpret a certain predetermined value as an indication for releasing an old TBF and for immediately setting up a new one according to the other contents of such a Packet Downlink Assignment message.

Figure 7:
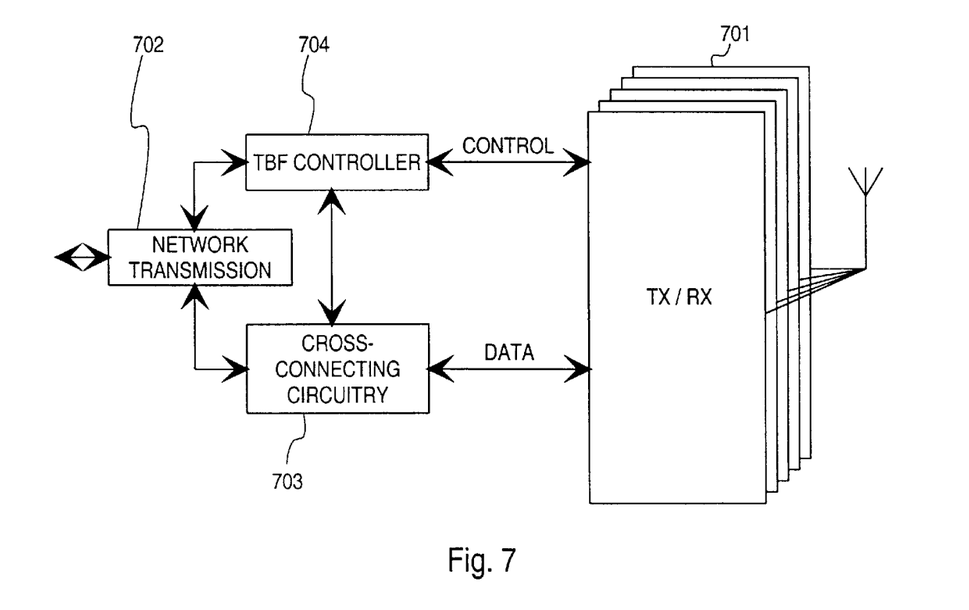
FIG. 7 illustrates an exemplary base station according to the invention.

Fig. 7 illustrates schematically a base station which comprises a plurality of transmit (TX) and receive (RX) units 701, a transmission unit 702 for communicating with a packet-switched network (GPRS) and a cross-connecting unit 703 for arranging the mapping of data between radio connections and network connections. It also comprises a TBF controller 704 responsible for setting up and maintaining the TBFs according to the setup requests received from the network on one hand and the setup requests received from the mobile stations on the other. According to the invention the TBF controller 704 is arranged firstly to construct downlink packet assignment messages so that by using the value of a certain field it may indicate whether the assignment concerns the reassignment of the resources of a previously defined TBF or whether the assignment is to be interpreted as a command to release a previous TBF and to immediately set up a new one. Secondly the TBF controller is arranged to investigate the answers from mobile stations to final acknowledgements and to interprete certain predefined contents of them as a request for the immediate setup of a new uplink TBF as a continuation to a terminating one.

Although the foregoing description uses the reserved names of certain messages and communication concepts which are strictly associated with a certain specification of a single packet-switched communication system, it is to be noted that the invention is generally applicable to all such communication systems in which the allocation of dedicated channel(s) remains valid for a short period after a certain last packet has been transmitted.

We will briefly refer to such alternative embodiments of the invention that would require more changes to the existing specifications of the GPRS system than the one discussed above. A first alternative embodiment is to arrange for a continued "follow-up" allocation of dedicated resources for a longer time than what has been defined in the current GPRS standards and proposals. We may require that after a previous TBF between a mobile station and the network has been terminated, a timer X with a predetermined cycle is started. The network will assign to the mobile station a limited dedicated uplink transmission resource so that the allocation is valid while the timer X is still running. The mobile station will continue listening to the dedicated downlink channels that were associated to the terminated TBF. If new uplink RLC data blocks come up in the mobile station while the timer X is still running, the mobile station will use its limited dedicated uplink transmission resource to transmit a specific indication about its need to set up a continued uplink TBF. If, on the other hand, the network finds out that a continued downlink TBF should be set up while the timer X is still running, it uses the previously used dedicated downlink channels (which the mobile station is still listening to) to transmit the corresponding Packet Assignment message. This embodiment has the drawback that some dedicated uplink capacity will be allocated in vain if the mobile station does not have any data to transmit. In such a case the mobile station may use the allocation for sending measurement results or other generally useful signalling.

A simple alternative for the continued uplink TBF is to allow for the mobile station to increment the value of the CV field during the countdown from value 15, is additional RLC data blocks come up before the value 0 has been reached. Currently the specifications unconditionally forbid any CV value incrementing to avoid confusion in the allocation of uplink block period allocations.

A possible situation to be dealt with is such where a mobile station has an active uplink TBF with the network but the characteristics of that TBF should be changed. As an example we may discuss a change in the required throughput or priority value. A known solution for upgrading a throughput or priority value is to transmit from the mobile station to the network a Packet Resource Request describing the new required TBF characteristics as soon as the mobile station knows that such an upgrading will be needed. The aim is then to make a characteristics update to the existing uplink TBF before the mobile station starts transmitting the RLC data blocks that require the upgraded throughput class or priority value. The problem of the proposed approach is that if the CV value countdown procedure for the RLC data blocks of the previous kind starts before the mobile station receives an acknowledgement from the network, the uplink TBF with the upgraded characteristics will terminate very soon. Also the proposed approch does not allow downgrading the throughput or priority value in the same way but calls for terminating the previous uplink TBF and setting up a new one from scratch. An alternative proposal for downgrading is to allow the uplink transmissions to continue without informing the network about the change; this might result in unfair treatment of simultaneous competing uplink TBFs which actually should receive better service than the "secretly" downgraded one.

The invention in the form described above allows for a continued uplink TBF to be set up fluently so that the up- or downgrading of the characteristics may be done at the time instant between the terminating TBF and the continued TBF. On the other hand the invention also allows for the characteristics of an existing TBF to be changed in the middle of the "old" RLC data blocks: even if a CV value countdown procedure is accidentally triggered, no significant harm will be caused because the continued TBF will be fluently set up anyway. However, it is more advantageous to change the uplink TBF characteristics after all "old" RLC data blocks have been succesfully transmitted and before the transmission of the "new" RLC data blocks commences, because in some cases it may happen that the network rejects the characteristics update as unacceptable and in that case it should be ensured that at least the "old" RLC data blocks get through before the connection is terminated due to the rejection from the network. Of course the same result could be achieved even with the characteristics update message being transmitted while the "old" RLC data blocks are still being transmitted if the characteristics update message includes a reference to the upcoming RLC data block after which the requested characteristics update should come into effect.

A continued TBF in the sense of the present invention may be used to circumvent the requirement in the present specifications that some changes are not allowed in the middle of a single TBF. As an example we may consider changing the RLC mode from acknowledged to unaknowledged or vice versa during an active TBF. Currently the proposed specifications strictly forbid changing the RLC mode in the middle of a TBF. An obvious change to the existing specifications would be simply allowing for such a change in which case the transmitting side should transmit to the receiving side a specific message informing it about the upcoming change and indicate the RLC block number from which the change would take effect. According to the invention there will be no need to specify the RLC block number if the change of mode takes place at the border between a terminating TBF and a continued TBF.

We claim:

1. A method for establishing a continued communication connection after a terminating communication connection between a transmitting station and a receiving station in a communication system where communication connections take place on communication resources temporarily associated to said communication connections, comprising, in the following order, the steps of:
   indicating the termination of a packet-switched uplink communication connection between a mobile station and a network in a mobile telecommunication system on a communication resource which is an unlink packet channel; and
   indicating the need for a continued communication connection within an uplink transmission instant assigned to the mobile station for use after a certain final data transmission through the terminating communication connection.

2. A method according to claim 1, wherein in a mobile telecommunication system where the terminating procedures of a packet-switched uplink communication connection without a subsequent continued communication connection comprise the steps of
   transmitting from the mobile station to the network a final data block containing an indication of its finality,
   transmitting from the network to the mobile station a final acknowledgement indicating the successful reception of the final data block, and
   transmitting from the mobile station to the network a control acknowledgement indicating the successful reception of the final acknowledgement, wherein
   said uplink transmission instant assigned to the mobile station for use after a certain final data transmission through the terminating communication connection is the uplink transmission instant for transmitting said control acknowledgement.

3. A method according to claim 2, comprising the step of transmitting, during said uplink transmission instant for transmitting said control acknowledgement, a modified control acknowledgement indicating the need for a continued communication connection.

4. A method according to claim 3, further comprising the step of transmitting, through a certain further dedicated communication resource, a detailed request for dedicated resources for the continued communication connection.

5. A method according to claim 2, comprising the step of transmitting, during said uplink transmission instant for transmitting said control acknowledgement, a detailed request for dedicated resources for the continued communication connection.

6. A method for establishing a continued communication connection after a terminating communication connection between a transmitting station and a receiving station in a communication system where communication connections take place on communication resources temporarily associated to said communication connections, comprising, in the following order, the steps of:
   indicating the termination of a packet-switched downlink communication connection between a network and a mobile station in a mobile telecommunication system on a downlink packet channel, and
   indicating the need for a continued communication connection within a downlink transmission instant on a downlink channel that was associated with data transmission through the terminating communication connection.

7. A method according to claim 6, wherein in a mobile telecommunication system where the assignment of downlink communication resources takes place through downlink resource assignment messages from a network to mobile stations, it comprises the step of transmitting, at a downlink transmission instant on a downlink channel that was associated with data transmission through the terminating communication connection, a modified downlink resource assignment message indicating the need for a continued communication connection.

8. A method for establishing a continued communication connection after a terminating communication connection between a transmitting station and a receiving station in a communication system where communication connections take place on communication resources temporarily associated to said communication connections, comprising, in the following order, the steps of:
   indicating the termination of a packet-switched unlink communication connection between a mobile station and a network in a mobile telecommunication system on a communication resource which is an uplink packet channel, indicating, within an uplink transmission instant assigned to the mobile station for use after a certain final data transmission through the terminating communication connection, the need for a continued communication connection with at least one characteristic that is different from the corresponding characteristic of the terminating communication connection.

9. A method according to claim 8, wherein the step of indicating the need for a continued communication connection comprises the step of indicating the need for a communication connection with different priority, class than that of the terminating communication connection.

10. A method according to claim 8, wherein the step of indicating the need for a continued communication connection comprises the step of indicating the need for a communication connection with different required throughput than that of the terminating communication connection.

11. A mobile station of a mobile telecommunication system, comprising:

means for setting up and maintaining uplink communication connections with a network, means for indicating the termination of a packet-switched uplink communication connection between the mobile station and the network on a communication resource which is an uplink packet channel, and means for indicating the need for a continued uplink communication connection within an uplink transmission instant assigned to the mobile station for use after a certain final data transmission through the terminating communication connection.

12. A mobile station according to claim 11, wherein said means for indicating the termination of a terminating packet-switched uplink communication connection comprise means for transmitting to the network a final data block containing an indication of its finality, and said means for indicating the need for a continued uplink communication connection comprise means for responding to a final acknowledgement indicating the successful reception of the final data block with a control acknowledgement indicating additionally the successful reception of the final acknowledgement.

13. A mobile station according to claim 11, wherein said means for indicating the termination of a terminating packet-switched uplink communication connection comprise means for transmitting to the network a final data block containing an indication of its finality, and said means for indicating the need for a continued uplink communication connection comprise means for responding to a final acknowledgement indicating the successful reception of the final data block with a detailed request for dedicated resources for the continued communication connection.

14. A mobile station according to claim 11, further comprising:

means for setting up and maintaining downlink communication connections with the network, means for monitoring, after the termination of a downlink communication connection, a set of downlink channels which were associated with the terminated downlink communication connection, and means for interpreting a certain predefined downlink message on one of the monitored downlink channels as an indication of a continued downlink communication connection.

15. A base station subsystem of a mobile telecommunication system, comprising:

means for setting up and maintaining downlink communication connections with mobile stations, means for indicating the termination of a packet-switched downlink communication connection between a network and a mobile station on a downlink packet channel, and means for indicating the need for a continued downlink communication connection within a downlink transmission instant on a downlink channel that was associated with data transmission through the terminating communication connection.

16. A base station subsystem according to claim 15, wherein said means for indicating the termination of a terminating downlink communication connection comprise means for transmitting to the mobile station a final data block containing an indication of its finality, and said means for indicating the need for a continued downlink communication connection comprise means for responding to a final acknowledgement indicating the successful reception of the final data block with a resource assignment message indicating an assignment of resources for a continued downlink communication connection.

17. A base station subsystem according to claim 15, further comprising:

means for setting up and maintaining uplink communication connections with mobile stations, means for responding to the transmission of an indicated final data block in an uplink communication connection with a final acknowledgement comprising an assignment for the transmission of a control acknowledgement, and means for interpreting a certain predetermined message, received as a control acknowledgement after the transmission of said final acknowledgement, as an indication of a need for a continued uplink communication connection.

18. A method for establishing a continued communication connection after a terminating of a communication connection between a transmitting station and a receiving station in a communication system wherein communication connections take place on communication resources temporarily assigned to said communication connections, comprising the steps of terminating the communication connection, indicating the termination of a packet-switched uplink communication connection between a mobile station and a network in a mobile telecommunication system on a communication resource which is an uplink packet channel, indicating the need for a continued communication connection within an uplink transmission instant assigned to the mobile station for use after a certain final data transmission through the terminating communication connection, and resuming the communication.

* * * * *